US009552336B2

(12) United States Patent
Deen et al.

(10) Patent No.: US 9,552,336 B2
(45) Date of Patent: Jan. 24, 2017

(54) METHODS AND SYSTEMS FOR PREPARING EXTENSIBLE MARKUP LANGUAGE (XML) DOCUMENTS AND FOR RESPONDING TO XML REQUESTS

(75) Inventors: Brian J. Deen, North Bend, WA (US); Joel M. Soderberg, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 12/834,759

(22) Filed: Jul. 12, 2010

(65) Prior Publication Data

US 2010/0281136 A1    Nov. 4, 2010

Related U.S. Application Data

(63) Continuation of application No. 11/175,231, filed on Jul. 6, 2005, now abandoned, which is a continuation of application No. 09/361,782, filed on Jul. 26, 1999, now Pat. No. 6,996,770.

(51) Int. Cl.
*G06F 17/00* (2006.01)
*G06F 17/22* (2006.01)
*G06F 17/30* (2006.01)
*H04L 29/08* (2006.01)
*G06F 17/27* (2006.01)

(52) U.S. Cl.
CPC ....... *G06F 17/2229* (2013.01); *G06F 17/2247* (2013.01); *G06F 17/272* (2013.01); *G06F 17/30014* (2013.01); *G06F 17/30905* (2013.01); *H04L 67/02* (2013.01)

(58) Field of Classification Search
CPC ............ G06F 17/30905; G06F 17/2241; G06F 17/30014; H04L 67/02
USPC .......................... 715/231, 236, 239, 249, 234
See application file for complete search history.

(56) References Cited

U.S. PATENT DOCUMENTS

| | | | |
|---|---|---|---|
| 5,701,451 A | 12/1997 | Rogers et al. | |
| 5,893,109 A * | 4/1999 | DeRose | G06F 17/30905 |
| 5,928,335 A * | 7/1999 | Morita | G06F 9/465 |
| | | | 709/203 |
| 6,012,098 A * | 1/2000 | Bayeh | G06F 17/30569 |
| | | | 707/E17.006 |

(Continued)

OTHER PUBLICATIONS

Paul Philion, "Build servlet-based enterprise Web applications" (C) 1998  http://www.javaworld.com/jw-12-1998/jw-12-servlethtml.html.*

(Continued)

*Primary Examiner* — Cesar Paula
*Assistant Examiner* — David Faber
(74) *Attorney, Agent, or Firm* — Danielle Johnston-Holmes; Tom Wong; Micky Minhas

(57) ABSTRACT

Methods and systems for generating and sending an XML document are described. In a specific implementation, methods and systems for responding to an XML client request utilize an XML response generator. The XML response generator responds to a client request without having to first build and save the entire response. An emitter object is provided that receives data that is gathered. The calls are made in a particular order and ensure that the hierarchical nature of the response that is being built is preserved. The emitter object translates the data that it receives into response portions that are in proper XML syntactic form.

4 Claims, 7 Drawing Sheets

(56) References Cited

U.S. PATENT DOCUMENTS

| | | | | |
|---|---|---|---|---|
| 6,067,559 | A * | 5/2000 | Allard | G06F 9/5055 |
| | | | | 709/202 |
| 6,128,644 | A * | 10/2000 | Nozaki | G06F 9/505 |
| | | | | 709/201 |
| 6,167,409 | A * | 12/2000 | DeRose | G06F 17/3089 |
| | | | | 707/999.01 |
| 6,185,610 | B1 * | 2/2001 | Nagatomo | G06Q 10/10 |
| | | | | 709/219 |
| 6,199,098 | B1 * | 3/2001 | Jones | G06F 17/30882 |
| | | | | 707/E17.013 |
| 6,249,844 | B1 | 6/2001 | Schloss et al. | |
| 6,272,537 | B1 * | 8/2001 | Kekic | G06F 8/34 |
| | | | | 709/203 |
| 6,282,542 | B1 * | 8/2001 | Carneal | G06F 17/30902 |
| 6,356,906 | B1 * | 3/2002 | Lippert | G06F 17/30595 |
| 6,366,947 | B1 | 4/2002 | Kavner | |
| 6,414,684 | B1 * | 7/2002 | Mochizuki | G06T 13/40 |
| | | | | 345/427 |
| 6,418,448 | B1 * | 7/2002 | Sarkar | G06F 17/30893 |
| 6,446,110 | B1 * | 9/2002 | Lection | H04L 29/06 |
| | | | | 707/999.01 |
| 6,480,860 | B1 * | 11/2002 | Monday | G06F 17/30893 |
| 6,993,715 | B2 | 1/2006 | Deen et al. | |
| 2002/0112157 | A1 * | 8/2002 | Doyle | H04L 63/0823 |
| | | | | 713/157 |
| 2005/0246630 | A1 * | 11/2005 | Deen et al. | 715/513 |
| 2005/0262436 | A1 | 11/2005 | Deen et al. | |

OTHER PUBLICATIONS

Pemburton et al., XHTML™ 1.0: The Extensible HyperText Markup Language, A Reformulation of HTML 4.0 in XML 1.0, W3C Working Draft May 5, 1999 http://www.w3.org/TR/1999/xhtml1-19990505.*

Vijay Mukhi, "ServerTest" last modified Aug. 17, 1998 http://www.vijaymukhi.com/vmis/servtest.htm.*

Goland, HTTP Extensions for Distributed Authoring—WEBDAV, Feb. 1999 http://ftp.ics.uci.edu/pub/ietf/webdav/protocol/rfc2518.pdf.*

Dav Frequently Asked Questions, http://www.webdav.org/other/faq.html, Archived on May 3, 1999; 8 pgs.

Franklin, Steve, "XML Parsers: DOM and SAX Put to the Test", Feb. 1, 2001 http://www.devx.com/xmi/Article/16922; 4 pgs.

"Fw: DOM vs. SAX" Feb. 11, 1999 http://lists.xml.org/archives/xml-dev/199902/msg00574.html; 8 pgs.

Goland et al.,"Extensions for Distributed Authoring on the World Wide Web—WebDAV, Internet Draft," Apr. 7, 1998, http://www.ics.uci.edu/-ejw/authoring/protocol/draft-ieff-webdav-protocol-08.txt; 87 pgs.

Grosso et al., XML Fragment Interchange, W3C Working Draft, Mar. 3, 1999 http://www.w3.org/TR/1999/WD-xml-fragment-19990303.html; 25 pgs.

Heinemann, Charles, "Internet Explorer 5 and XML," Nov. 4, 1998, http://xml.coverpages.org/heinemann19981104.html; 6 pgs.

"Microsoft Delivers Industry's First XML-Compliant Browser," Mar. 31, 1999, http://xml.coverpages.org/microsoft19990331.html; 3 pgs.

Reilly, "Java Network Programming FAQ" Last modification date: Jun. 18, 1999, http://avmp01.mppmu.mpg.de/FA~java_network programming. Faq; 13 pgs.

Whitehead et al.; "WEBDAV: IETF Standard for Collaborative Authoring on the Web"; IEEE Internet Computing, pp. 34-40, Sep./Oct. 1998; 7 pgs.

"XML in Netscape and Explorer", http://www.w3schools.com/xml/xml_browsers.asp; 2 pgs.

U.S. Official Action dated Sep. 17, 2002 U.S. Appl. No. 09/361,782, 14 pgs.

U.S. Official Action dated Mar. 6, 2003 U.S. Appl. No. 09/361,782, 16 pgs.

U.S. Official Action dated Aug. 13, 2003 U.S. Appl. No. 09/361,782, 22 pgs.

U.S. Official Action dated Jan. 26, 2004 U.S. Appl. No. 09/361,782, 27 pgs.

U.S. Official Action dated Sep. 20, 2004 U.S. Appl. No. 09/361,782, 25 pgs.

U.S. Official Action dated Feb. 8, 2005 U.S. Appl. No. 09/361,782, 29 pgs.

Notice of Allowance dated May 31, 2005 U.S. Appl. No. 09/361,782, 11 pgs.

U.S. Official Action dated Sep. 23, 2005 U.S. Appl. No. 11/175,231, 8 pgs.

U.S. Official Action dated Jan. 27, 2006 U.S. Appl. No. 11/175,231, 20 pgs.

U.S. Official Action dated May 5, 2006 U.S. Appl. No. 11/175,231, 16 pgs.

Appeal Brief dated Oct. 6, 2006 U.S. Appl. No. 11/175,231, 28 pgs.
Supplemental Appeal Brief dated Nov. 16, 2006 U.S. Appl. No. 11/175,231, 14 pgs.

Answer to Appeal Brief dated Jan. 5, 2007 U.S. Appl. No. 11/175,231, 25 pgs.

Answer to Appeal Brief dated Mar. 21, 2007 U.S. Appl. No. 11/175,231, 25 pgs.

Reply Brief dated Apr. 5, 2007 U.S. Appl. No. 11/175,231, 14 pgs.
Patent Board Decision dated Nov. 26, 2008 U.S. Appl. No. 11/175,231, 25 pgs.

U.S. Official Action dated Feb. 26, 2009 U.S. Appl. No. 11/175,231, 21 pgs.

U.S. Official Action dated Aug. 5, 2009 U.S. Appl. No. 11/175,231, 21 pgs.

U.S. Official Action dated Jan. 12, 2010 U.S. Appl. No. 11/175,231, 19 pgs.

* cited by examiner

METHODS AND SYSTEMS FOR PREPARING EXTENSIBLE MARKUP LANGUAGE (XML) DOCUMENTS AND FOR RESPONDING TO XML REQUESTS

CROSS-REFERENCE TO RELATED APPLICATION(S)

This application is a continuation of and claims priority to U.S. patent application Ser. No. 11/175,231, which is a continuation of and claims priority to U.S. patent application Ser. No. 09/361,782, the disclosure of each is incorporated by reference herein.

TECHNICAL FIELD

This invention relates to methods and systems for preparing Extensible Markup Language (XML) documents and, in particular, to methods and systems for responding to XML requests.

BACKGROUND

Extensible Markup Language (XML) is a meta-markup language that provides a format for describing structured data. XML is a subset of Standard Generalized Markup Language (SGML) that provides a uniform method for describing and exchanging structured data in an open, text-based format, and delivers this data by use of standard HTTP protocol. XML utilizes the concepts of elements and namespaces. XML is similar to HTML, but facilitates more precise declarations of content and more meaningful search results across multiple platforms.

XML "elements" are structural constructs that consist of a start tag, an end or close tag, and the information or content that is contained between the tags. A start tag is formatted as "<tag name>" and an end tag is formatted as "</tag name>". In an XML document, start and end tags can be nested within other start and end tags. All elements that occur within a particular element must have their start and end tags occur before the end tag of that particular element. This defines a strict tree-like structure that can be used to generate an XML document, or by an XML parser to organize and parse the XML document. Each element forms a node in this tree, and potentially has "child" or "branch" nodes. The child nodes represent any XML elements that occur within the start and end tags of the "parent" node.

XML accommodates an infinite number of database schemas. Within each schema, data is represented by element names. Each schema is able to define its own "dictionary" of element names, referred to as a "namespace." Namespace identifiers are used within an XML document to qualify element names, thereby allowing the same names to be used within different schemas.

Namespace inheritance within an XML document allows non-qualified names to use "default" namespaces. The default namespace for any particular XML element is whatever default namespace is applicable to the parent of the particular element. A namespace specification within an XML document is said to have a "scope" which includes all child nodes beneath the namespace specification.

Typically, XML documents are exchanged between different entities, such as client and server computers, in the form of requests and responses. A client might generate a request for information or a request for a certain server action, and a server might generate a response to the client that contains the information or confirms whether the certain action has been performed. In many cases, it is convenient to represent these XML documents in memory as a hierarchical tree structure. Once the hierarchical tree structure is built, the actual XML document in proper syntactic form can then be assembled. Consider the following exemplary XML code:

```
<orders xmlns:person="http://www.schemas.org/people"
    xmlns:dsig="http://dsig.org">
    <order>
    <sold-to>
        <person:name>
            <person:last-name>Layman</person:last-name>
            <person:first-name>Andrew</person:first-name>
        </person:name>
    </sold-to>
    <sold-on>1997-03-17</sold-on>
    <dsig:digital-signature>1234567890</dsig:digital-signature>
    </order>
</orders>
```

This code includes two XML namespace declarations that are each designated with "xmlns". The declarations include a prefix, e.g. "person" and "dsig" respectively, and the expanded namespace to which each prefix refers, e.g. "http://www.schemas.org/people", and "http://dsig.org" respectively. This code tells any reader that if an element name begins with "dsig:" its meaning is defined by whoever owns the "http://www.dsig.org" namespace. Similarly, elements beginning with the "person:" prefix have meanings defined by the "http://www.schemas.org/people" namespace.

Namespaces ensure that element names do not conflict, and clarify who defined which term. They do not give instructions on how to process the elements. Readers still need to know what the elements mean and decide how to process them. Namespaces simply keep the names straight.

FIG. 1 shows how the structure of the above code can be represented in a hierarchical tree structure. In FIG. 1, all of the elements or nodes are set out in an exemplary tree that represents the XML document. Such a structure is typically constructed in memory, with each node containing all data necessary for the start and end tags of that node.

It has been typical in the past to build the entire tree structure, such as the one shown in FIG. 1, before building an XML document itself. For large XML documents, this can consume a great deal of memory and processor time. Thus, it would be desirable to avoid this process if at all possible.

Accordingly, this invention arose out of concerns associated with providing improved methods and systems for generating XML documents that do not require or need a hierarchical tree structure to be built and stored in memory in order for the XML document to be generated.

SUMMARY

Methods and systems for generating and sending XML documents and, in particular, generating and sending an XML response to an XML client request are described. In the described embodiment, an XML document is prepared and sent to a client only a portion at a time. XML document portions are generated and sent until an entire XML document is sent to the client. In a specific implementation an XML response generator is provided and responds to a client request without having to first build and save a hierarchical tree structure in memory that represents the response. The response generator includes one or more request method objects. There is one request method object for each particular type of client request that might be received. Each request method object knows and gathers the data that is needed to respond to its particular associated client request. In addition, the request method object knows the order in which the information must be provided.

The request method object calls an emitter object with the data that is gathered by the request method object. The calls are made in a particular order and ensure that the hierarchical nature of the response that is being built is preserved. The emitter object translates the data that it receives into response portions that are in proper XML syntactic form.

A body object is provided to manage a buffer. The emitter object calls the body object with the properly-formatted XML response portions. The response portions are placed in the buffer. When a defined buffer threshold is reached, the buffered response portions are sent to the client.

DETAILED DESCRIPTION

Exemplary Architecture

Figure 1:
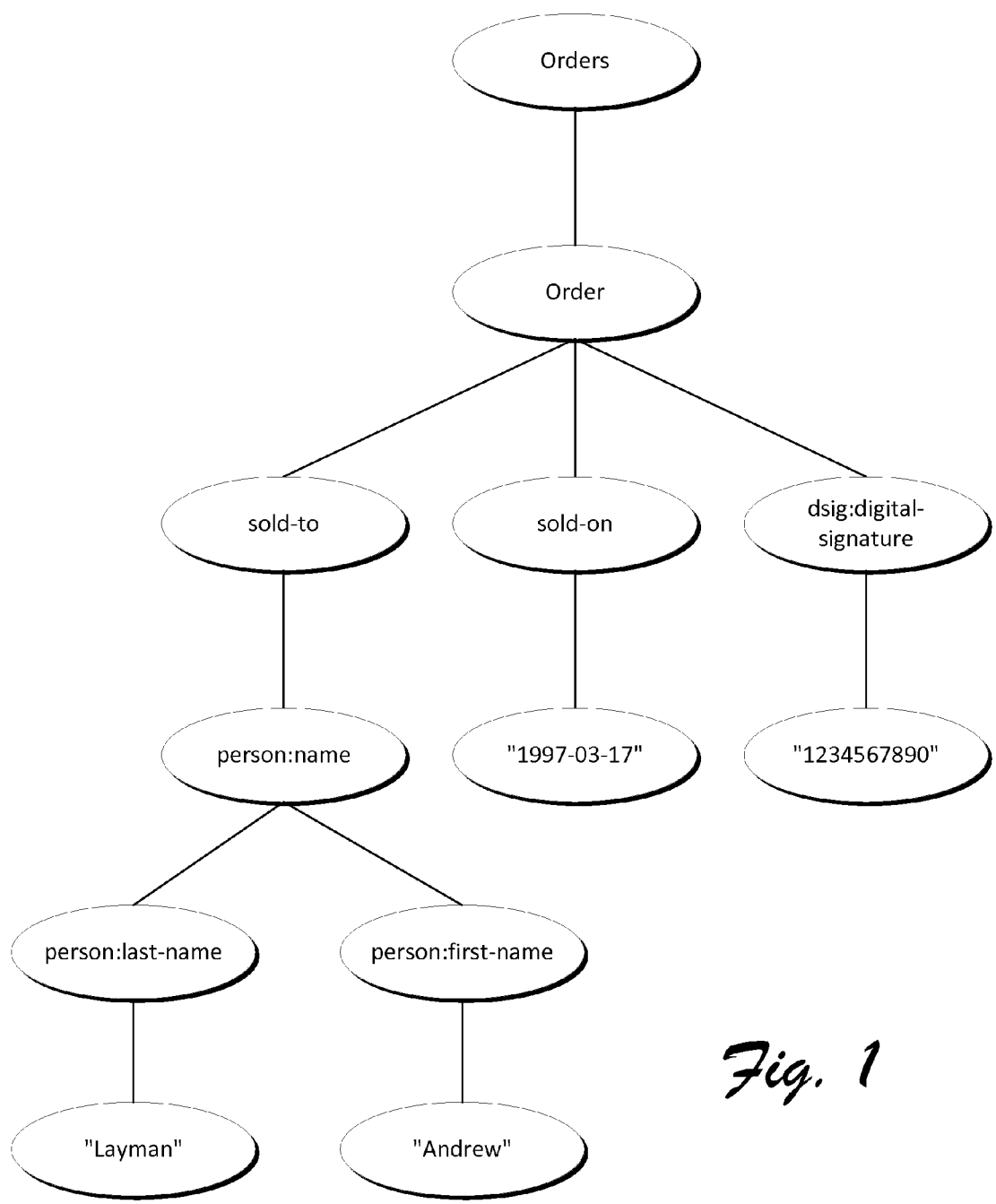
FIG. 1 is a diagram of a hierarchical tree structure that represent an XML document.
Figure 2:
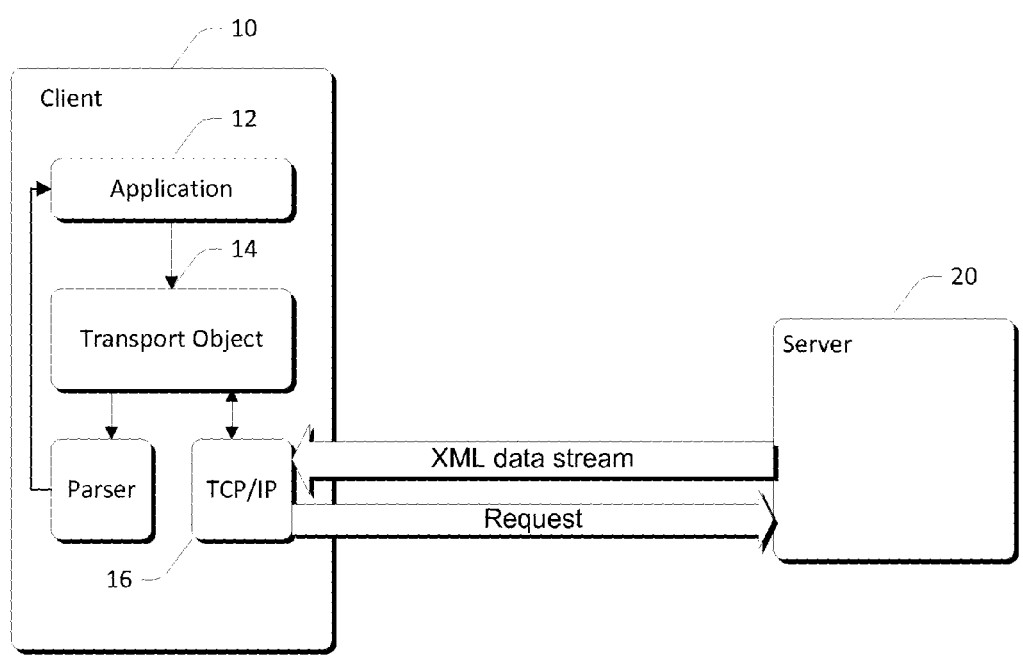
FIG. 2 is a block diagram that shows an exemplary client/server architecture in accordance with an embodiment of the invention.

Before describing the various inventive methods and structures that are used in implementing the various functions described below, reference is made to FIG. 2 which shows but one example of an architecture that is suitable for use in connection with the invention. It is to be understood that the architecture that is described constitutes but one example and is not intended to limit the invention in any way.

A client is shown generally at 10 and includes a software application 12, a transport object 14, a TCP/IP module 16 and a parser 18. Although these components are shown as being grouped within the client, they can be separately organized outside of the client application 12. An exemplary client or application is one that generates requests for XML data and receives responses to its requests in the form of XML data streams that must be parsed. One specific example of an application is Microsoft's Outlook Express.

Transport object 14 can be any transport object that is used in connection with sending and receiving requests. In one specific example that transport object can be a Distributed Authoring and Versioning (WebDAV) transport object that is designed to work in connection with WebDAV requests and responses. Specific examples of these are given later in the document.

In operation, an application typically generates a request that is sent through the transport object 14 and the TCP/IP module 16 to a server 20. The server receives the request, processes it, and sends an XML response to the client.

An exemplary server 20 is Microsoft's Internet Information Service (IIS). The XML data is received into the TCP/IP module 16 and the transport object 14. The transport object then begins pushing the data into the parser 18. The parser 18 then begins to operate on the XML data stream by parsing it and providing it to the application 12. In this example, parser 18 is a so-called "push-model" parser because XML data is pushed into it by the transport object 14. Aspects that are described below are associated with the processing that takes place to build the XML response that is sent by the server 20 to the client or application 12 in response to a client request.

Overview

Methods and systems are provided in which an XML document is prepared and sent to a client only a portion at a time. XML document portions are generated and sent until an entire XML document is sent to the client. In a specific implementation, various methods and systems respond to an XML client request without the need to build and save in memory a hierarchical tree structure that represents the entire XML response. In the described embodiment, an XML response generator functions to enable a response to be prepared and sent to a client in a piecewise fashion.

Figure 3:
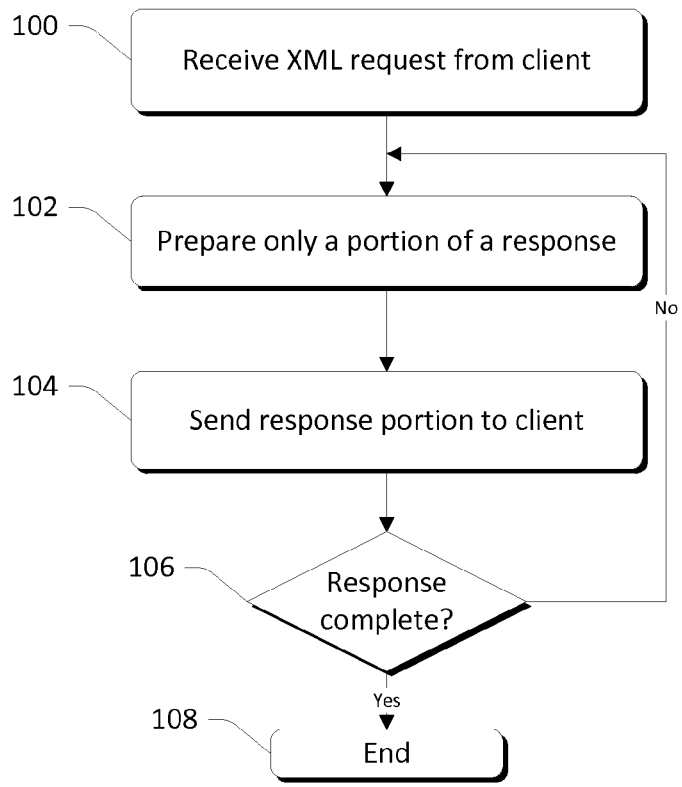
FIG. 3 is a flow diagram that describes steps in a method for generating an XML response.

FIG. 3 shows a flow diagram that illustrates an exemplary method for generating and sending an XML response that is explained in more detail below. Aspects of the invention that are described below are described in the context of a protocol that exists between a client and a server. In this specific protocol, a client sends a request to the server and the server responds with a response. It is to be understood, however, that principles of the invention have applicability outside of the client/server protocol example that is given. Specifically, aspects of the invention can be employed in any scenario where one desires to generate an XML document, whether it be on the client or server side.

At step 100 a server, such as server 20 (FIG. 2) receives an XML client request. The server 20 prepares only a portion of a response (Step 102) to the client's request. The server 20 then sends the response portion (step 104) to the client. The server 20 then determines whether the response preparation is complete (step 106). If it is not, then step 106 loops back to step 102 and the server 20 prepares another portion of the response. Accordingly, the server 20 repeats steps 102 and 104 until a complete response is sent to the client, at which time the processing for that response ends (step 108).

This constitutes a highly desirable and timely improvement over past methods which required that the entire XML response be built and saved in memory before it was sent to the client. One of the advantages of the present response processing becomes apparent in the context of very large responses that must be prepared for certain client requests. An example of such a response is called a "multistatus" response which is discussed in more detail below. By sending a response to a client in a piecewise manner, the client can begin processing the response portions (e.g. parsing the response portions and providing the data to the client application 12) sooner that it could if the server had to build the entire response, save it in memory, and send it out. This, in turn, translates to improved processing speeds and reductions in the overhead processing that is necessary to prepare and send the responses.

Figure 4:
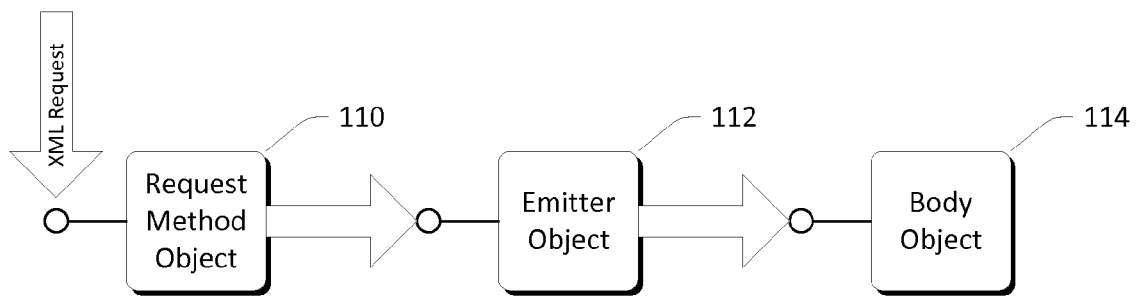
FIG. 4 is a diagram that shows exemplary inventive objects and their interaction with one another.

FIG. 4 shows some exemplary inventive programming structures that can be utilized to generate and send the individual client response portions. Collectively, these programming structures provide an XML response generator. In this example, the response generator includes a request method object 110, an emitter object 112 and a body object 114. These objects work together to generate and send response portions to a client in a piecewise manner. In the described embodiment, there is a request method object 110 for each type of request that can be received from a client. Client request types are defined in terms of the HTTP verbs that are used in the request. When a request is received, the type of request is determined and then an appropriate request method object, e.g. object 110, is created. The request method object 110 performs data gathering functions in which it gathers the appropriate data to include in the client's response. Accordingly, request method object 110 constitutes but one example of a data-gathering mechanism. When the data is gathered by the request method object 110, a series of calls are made to the emitter object 112. The calls include the data that has been gathered and tell the emitter object 112 the information it needs to do its job. The request method object 110 also knows what element tags or nodes that it needs in its response. This information is also conveyed to the emitter object 112 in the calls that are made by the request method object 110. The emitter object 112 is then responsible for formatting the gathered data into an appropriate XML syntax for the response. Accordingly, the emitter object 112 constitutes but one example of a data-formatting mechanism.

In this example, the request method object 110 does not have to know anything about the syntax of the response that is going to be built by the emitter object 112. It only needs to know the information that is necessary for the response, e.g. the XML nodes, their organization and order within the XML response, any text values that are to be included in the response, and the like. Since there is a request method object 110 for each type of client request that can be received, these objects only have to know the information or data that is associated with their particular type of client request. In this example, the emitter object 112 is primarily a mechanism by which the information or data is placed into the correct syntactic format. Thus, the emitter object 112 does not have to do any data gathering because the data and all other information it needs is provided to it by the request method object 110.

When the emitter object 112 formats the response portions, it provides the response portions to the body object 114. In this example, the body object 114 is a response-sending mechanism that manages the sending function in which the response portions are sent to the client. The body object 114 can also perform other functions such as setting up so-called boiler plate portions of the response (e.g. an XML prologue) that is to be sent. The body object 114 can also accumulate response portions and send them to the client at an appropriate time.

Thus, the XML response generator is able to generate and send response portion to a client in a piecewise fashion. This avoids having to build and save an entire hierarchical tree structure that represents the response document.

Exemplary Computer System

Figure 5:
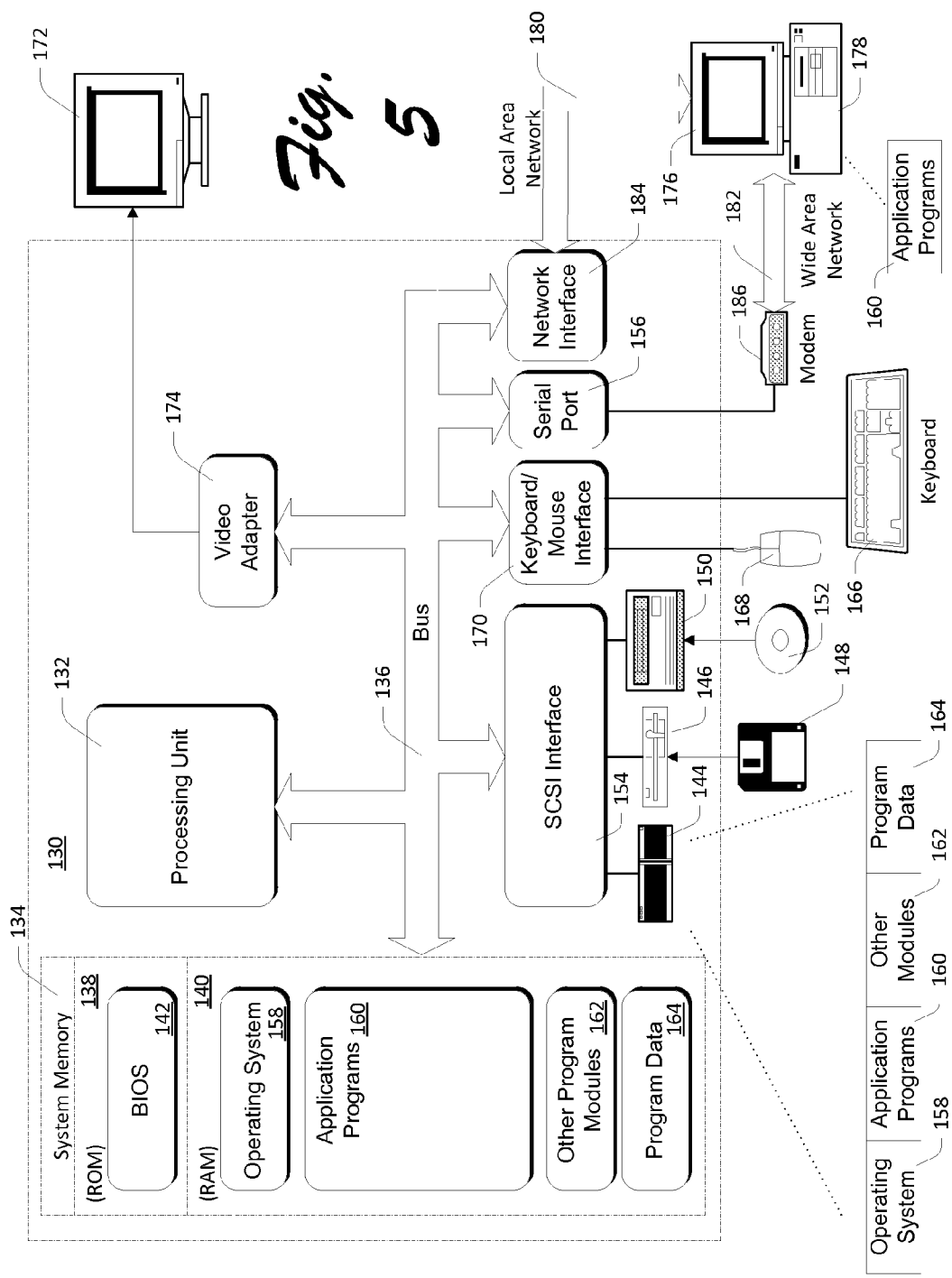
FIG. 5 is a computer system that is suitable for use in implementing embodiments of the invention.

FIG. 5 shows a general example of a computer 130 that can be used in accordance with the invention. Various numbers of computers such as that shown can be used in the context of a distributed computing environment that includes client and server machines.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 5. The logical connections depicted in FIG. 5 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

WebDAV

One of the areas of application for the described embodiment is in the context of preparing and sending responses to client Web Distributed Authoring and Versioning (WebDAV) requests. WebDAV is an extension to the HTTP/1.1 protocol that allows clients to perform remote web content authoring operations. This extension provides a coherent set of methods, headers, request entity body formats, and response entity body formats that provide operations for properties, collections, locking and namespace operations. With respect to properties, WebDAV provides the ability to create, remove, and query information about Web pages, such as their authors, creation dates, etc. With respect to collections, WebDAV provides the ability to create sets of documents and to retrieve a hierarchical membership listing (like a directory listing in a file system). With respect to locking, WebDAV provides the ability to keep more than one person from working on a document at the same time. This prevents the "lost update problem," in which modifications are lost as first one author then another writes changes without merging the other author's changes. With respect to namespace operations, WebDAV provides the ability to instruct the server to copy and move Web resources.

In HTTP/1.1, method parameter information is exclusively encoded in HTTP headers. Unlike HTTP/1.1, WebDAV encodes method parameter information either in an Extensible Markup Language (XML) request entity body, or in an HTTP header. The use of XML to encode method parameters is motivated by the ability to add extra XML elements to existing structures, provide extensibility; and by XML's ability to encode information in ISO 10646 character sets, providing internationalization support. In addition to encoding method parameters, XML is used in WebDAV to encode the responses from methods, providing the extensibility and internationalization advantages of XML for method output, as well as input.

The following WebDAV HTTP methods use XML as a request and response format. The reader is assumed to have some familiarity with WebDAV HTTP methods or verbs. A brief description, however, of some pertinent WebDAV HTTP methods or verbs appears in the table immediately below:

| WebDAV HTTP methods | |
| --- | --- |
| PROPPATCH | The PROPPATCH method processes instructions specified in the request body to set and/or remove properties defined on the resource identified by the Request-URI. |
| PROPFIND | The PROPFIND method retrieves properties defined on the resource identified by the Request-URI, if the resource does not have any internal members, or on the resource identified by the Request-URI and potentially its member resources, if the resource is a collection that has internal member URIs. |
| LOCK | A LOCK method invocation creates the lock specified by the lockinfo XML element on the Request-URI. Lock method requests SHOULD have a XML request body which contains an owner XML element for this lock request, unless this is a refresh request. The LOCK request may have a Timeout header. The LOCK is used to take out a lock of any access type. |
| UNLOCK | The UNLOCK method removes the lock identified by the lock token in the Lock-Token request header from the Request-URI, and all other resources included in the lock. |
| MOVE | The MOVE operation on a non-collection resource is the logical equivalent of a copy (COPY), followed by consistency maintenance processing, followed by a delete of the source, where all three actions are performed automatically. The consistency maintenance step allows the server to perform updates caused by the move, such as updating all URIs other than the Request-URI which identify the source resource, to point to the new destination resource. Consequently, the Destination header MUST be present on all MOVE methods and MUST follow all COPY requirements for the COPY part of the MOVE method. |
| COPY | The COPY method creates a duplicate of the source resource, identified by the Request-URI, in the destination resource, identified by the URI in the Destination header. |
| SEARCH | The SEARCH method allows queries against the different properties. |
| MKCOL | The MKCOL method is used to create a new collection. |

Multistatus Response

In one example, a client request is received and a "multistatus" response is prepared and sent to the client. A "multistatus" response is a special response body that is a text/xml or application/xml HTTP entity that contains a single XML element called "multistatus", that contains a set of XML elements called "response" elements. The table provided below summarizes element definitions of elements that appear in an exemplary multistatus response:

| Element Name | Namespace | Purpose | Description |
|---|---|---|---|
| multistatus | DAV | Contains multiple response messages. | The response description at the top level is used to provide a general message describing the overarching nature of the response. If this value is available an application may use it instead of presenting the individual response descriptions contained within the responses. |
| response | DAV | Holds a single response describing the effect of a method on resource and/or its properties. | A particular href MUST NOT appear more than once as the child of a response XML element under a multistatus XML element. This requirement is necessary in order to keep processing costs for a response to linear time. Essentially, this prevents having to search in order to group together all the responses by href. There are, however, no requirements regarding ordering based on href values. |
| href | DAV | Identifies the content of the element as a URI. | |
| propstat | DAV | Groups together a prop and status element that is associated with a particular href element. | The propstat XML element MUST contain one prop XML element and one status XML element. The contents of the prop XML element MUST only list the names of properties to which the result in the status element applies. |
| status | DAV | Holds a single HTTP status-line. | |
| prop | DAV | Contains properties related to a resource. | The prop XML element is a generic container for properties defined on resources. All elements inside a prop XML element MUST define properties related to the resource. No other elements may be used inside of a prop element. |

Exemplary Multistatus Response

Figure 6:
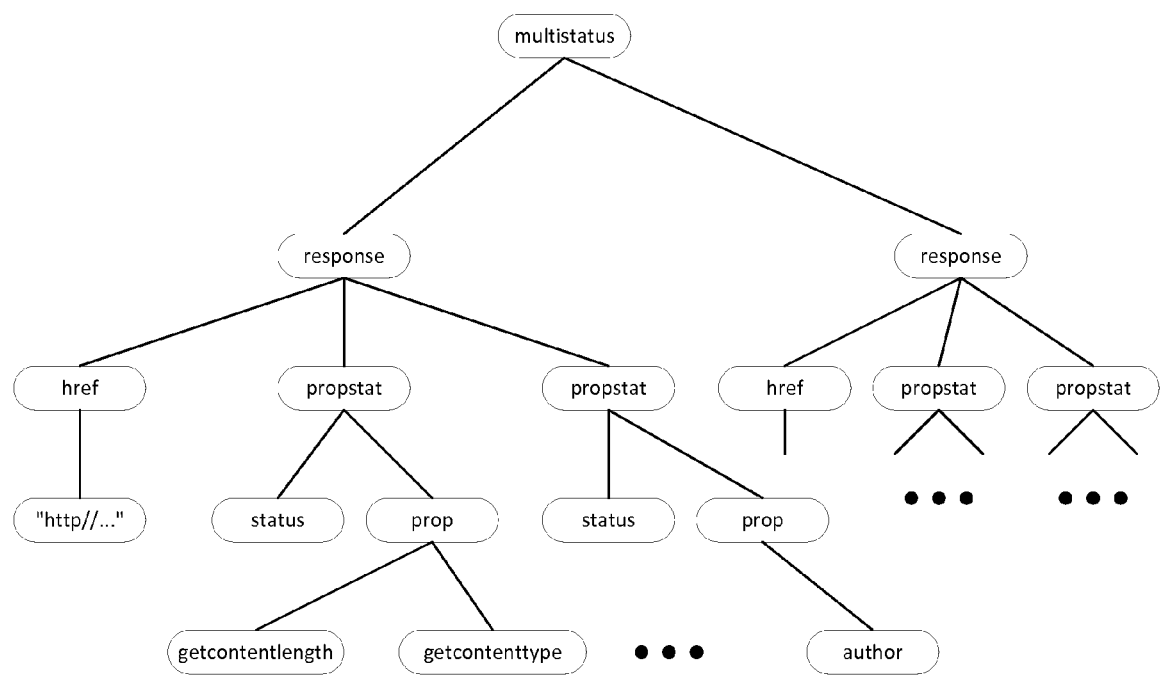
FIG. 6 is a diagram that shows a portion of a hierarchical tree structure that represents a "multistatus" response that is discussed in the "Detailed Description" section.

An exemplary multistatus response in XML format is shown below. A portion of a corresponding tree structure for the exemplary multistatus response is shown in FIG. 6. Because client responses can be quite large, e.g. "multistatus" responses, having to build the entire tree structure in memory for the response, prior to generating and sending a client's response, can undesirably increase client and server response times and, necessarily, increase the complexity of the processing overhead.

```
<?xml version="1.0" ?>
<a:multistatus xmlns:a="DAV:" xmlns:b="urn:uuid:c2f41010-65b3-
11d1-a29f-00aa00c14882/" >
<a:response>
    <a:href>http://server/folder/file1.html</a:href>
        <a:propstat>
    <a:status>HTTP/1.1 200 OK</a:status>
    <a:prop>
        <a:getcontentlength b:dt="int" >694</a:contentlength>
        <a:getcontenttype>text/html</a:getcontenttype>
    </a:prop>
    </a:propstat>
    <a:propstat>
    <a:status>HTTP/1.1 404 Resource Not Found</a:status>
    <a:prop>
        <author/>
    </a:prop>
    </a:propstat>
```

-continued

```
</a:response>
<a:response>
    <a:href>http://server/folder/test2.html</a:href>
    <a:propstat>
    <a:status>HTTP/1.1 200 OK</a:status>
    <a:prop>
        <a:getcontentlength b:dt="int" >1064</a:contentlength>
        <a:getcontenttype>text/html</a:getcontenttype>
    </a:prop>
    </a:propstat>
    <a:propstat>
    <a:status>HTTP/1.1 404 Resource Not Found</a:status>
        <a:prop>
        <author/>
    </a:prop>
    </a:propstat>
</a:response>
</a:multistatus>
```

XML Response Generator

To reduce processing overhead complexities and increase client response efficiencies, an XML response generator is provided that builds and sends portions of a client response to a client one piece at a time. This enables the client to begin processing the response so that the data contained therein can be put to use in a more timely fashion. Accordingly, the piecewise processing and sending of the client response portions renders it unnecessary for an entire hierarchical tree structure to be built and stored in memory prior to generating the XML response.

Figure 7:
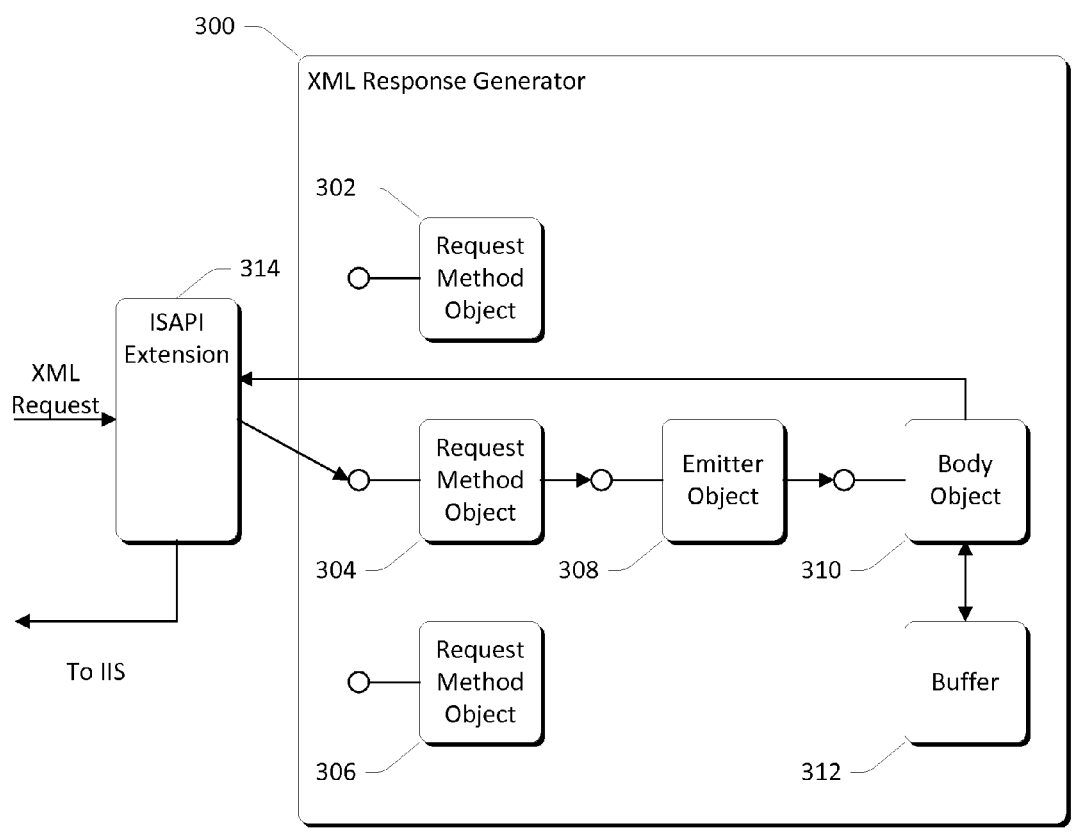
FIG. 7 is a block diagram of an XML response generator in accordance with one embodiment of the invention.

FIG. 7 shows an exemplary implementation of an XML response generator 300 that is configured for use in connection with Microsoft's Internet Information Service (IIS). The response generator 300 includes one or more request method objects 302, 304, and 306. There is one request method object for each of the client request types that might be received. For example, for a PROPFIND request, a request method object "CpropFindRequest" is created. The XML response generator also includes an emitter object 308 and a body object 310. In this example, the request method objects 302, 304, and 306 together with the emitter object 308 constitute response-preparing mechanisms that prepare only portions of a response at a time. A buffer 312 is provided and, in this example, is associated with the body object 310. Buffer 312 buffers response portions that are received from the emitter object 308. The buffer has a defined threshold which, when satisfied, enables the body object 310 to send the buffered response portions to the client. The buffered response portions that are sent at any one time constitute less than an entirety of a complete client response. Accordingly, the body object 310 and buffer 312 cooperate to send the response portions that are received from the emitter object 308 to the client. In this particular example, an Internet Service Application Programming Interface (ISAPI) extension 314 is provided and is a request-receiving mechanism that receives client XML requests. ISAPI extension 314 is also responsible for returning the piece-wise generated XML response data into IIS responsive to calls that the body object 310 makes to the ISAPI extension.

Figure 8:
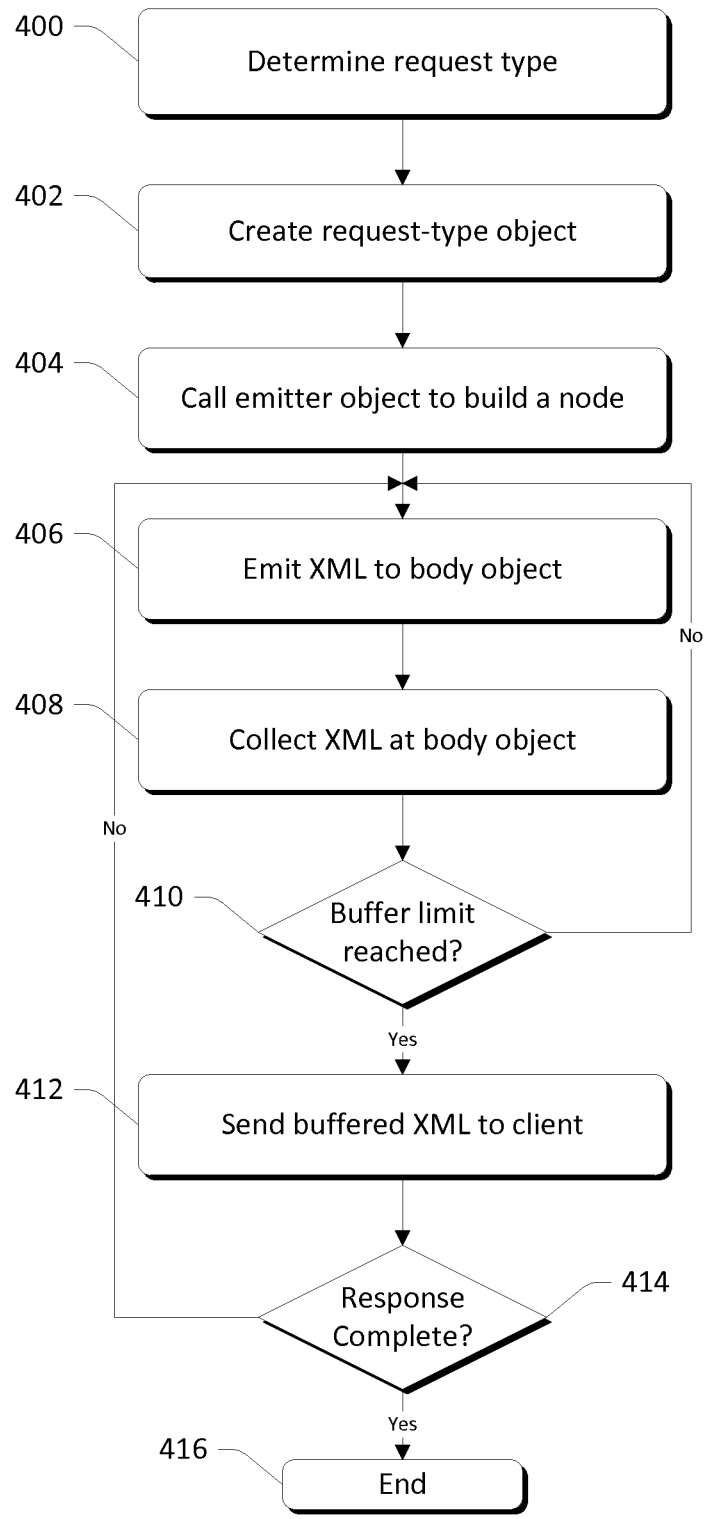
FIG. 8 is a flow diagram that describes steps in a method for generating an XML response in connection with the FIG. 7 XML response generator.

FIG. 8 shows a flow diagram that describes steps in a method for responding to an XML client request. When a client request is received, e.g. by the ISAPI extension 314 (FIG. 7), step 400 determines the type of client request. This can be determined from the request method, i.e. HTTP verb, that is used in the request. In the above example, a client request in the form of a WebDAV PROPFIND request is received. When the request type is determined, step 402 creates or instantiates a request-type or request method object (e.g. objects 302, 304, or 306 in FIG. 7) for that particular request type. In this example, there is a request-type object that can be instantiated for each particular request that might be received from a client. So, in this example, for a PROPFIND request a "CPropFindRequest" object is created.

Each request-type or request method object is aware of the information that is necessary for its particular type of response to be generated. In addition, each request type object knows the specific or defined order for the calls that it must make to the emitter object 308 (FIG. 7). That is, because the client response is being generated in a piecewise fashion without building the entire hierarchical tree structure for the response, each request type object needs to make sure that the order of the hierarchy is preserved in the individual response portions that are generated. For example (see FIG. 6), each "response" node can include only one "href" node. The "href" node must come before any "propstat" nodes. Each "propstat" node includes one "status" node and one "prop" node. In the past where an entire hierarchical tree structure was built in memory, nodes or elements could be added at any time and at any place in the tree because the response had not yet been formulated and sent to the client. Here, however, individual portions of the response are being generated and sent to the client so that a node or element cannot later be added to a response portion that has already been sent to the client. The way that the order of the hierarchy is preserved is by generating and sending calls to the emitter object 308 in a defined order that ensures that the hierarchical nature of the overall response is preserved. So, using the tree structure of FIG. 6 as an example, the request type object would want to make calls in an order that results in generating: the "multistatus" element, then the first "response" element, then the "href" element for the first response element, then the first "propstat" element for the first "response" element, then the "status" element for the first "propstat" element, then the "prop" element for the first "propstat" element, and then the sub-elements under the "prop" element, and so on. Since the response portions are being generated and sent in a serial, piecewise fashion, it is important to preserve the hierarchical nature of the client's complete response. So, each request type object knows the information or data that it needs and the order of the calls it needs to make to the emitter object.

Once the request-type object has been created and gathers the information that is necessary for building a portion of the response, the request-type object calls the emitter object (step 404) and provides the information to the emitter object. The emitter object 308 then takes the information provided to it and generates syntactically appropriate XML response portions. In doing so, the emitter object builds the XML response in a piecewise, node-by-node fashion. When the emitter object has built an XML response portion, it emits that response portion to the body object 310 (step 406). In this example, the body object 310 manages a buffer 312. The buffer 312 has a set threshold that defines how much XML data it can hold. This enables the body object 310 to accumulate or collect XML data (step 408). Step 410 determines whether the buffer threshold has been reached. If the threshold has not been reached or satisfied, step 410 loops back to step 406 which emits additional response portions to the body object. If, on the other hand, the buffer threshold has been reached, then step 412 sends the buffered XML response portions to the client. In this example, the body object 310 calls the ISAPI extension 314 which then returns the XML data to IIS. Step 414 checks to see whether the client response is complete. If it is not, then step 414 loops back to step 406 which emits XML data from the emitter object 308 to the body object 310. If the response is complete, however, then the processing for that response is over (step 416).

An advantage of the described embodiment is that processing of a client's XML request does not require building an entire hierarchical tree structure in memory prior to preparing the XML response and sending it to the client. Rather, client responses are generated in a piecewise, serial fashion. Individual response portions are prepared and sent to the client as the portions are generated. This can assist the client in beginning its processing of a response that might in some instances be quite lengthy. In addition, response processing advantages are achieved by separating functionalities into data-gathering functions that are directed to gathering data that is specific to a particular client request that is received, and data-formatting functions that format the data into syntactically correct XML response portions.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:

a processor; and a memory storing a program which, when executed by the processor, performs a method of responding to a request for Extensible Markup Language (XML) comprising:

gathering data for a response to the received request using a request method object;

calling an emitter object and passing the gathered data to the emitter object in a defined order preserving the order of the hierarchy of the XML document to be created;

formatting a portion of the gathered data into a correct XML syntax using the emitter object; and emitting the portion of the formatted gathered data from the emitter object to a body object, the body object accumulating the formatted gathered data in a buffer;

sending the formatted gathered buffered data when the buffer contains a defined amount of formatted gathered data that is less than an amount that would equal a complete response; and formatting, emitting, and sending subsequent portions until a complete response has been generated.

2. The system of claim 1, wherein: the calling comprises calling the emitter object multiple times; and the emitting comprises emitting multiple amounts of formatted gathered data.

3. The system of claim 1, wherein:

the calling comprises calling the emitter object multiple times and in a defined order; and the emitting comprises emitting multiple amounts of formatted gathered data.

4. The system of claim 1, wherein the body object sends further processes the portion of the formatted gathered data to add boilerplate.

* * * * *